United States Patent
Ulbrich et al.

[11] Patent Number: 5,901,449
[45] Date of Patent: May 11, 1999

[54] CUTTING APPLIANCE FOR FILAMENT-TYPE MATERIAL

[75] Inventors: Armin Ulbrich, Detmold; Ulrich Wiebe, Dorentrup, both of Germany

[73] Assignee: Rohm And Haas Company, Philadelphia, Pa.

[21] Appl. No.: 08/928,190

[22] Filed: Sep. 12, 1997

[30] Foreign Application Priority Data

Sep. 13, 1996 [DE] Germany ............. 196 37 430

[51] Int. Cl.$^6$ ............................................. B26D 5/08
[52] U.S. Cl. ................................ 30/278; 83/587
[58] Field of Search ................ 30/92, 258, 278, 30/90.1; 83/587, 636

[56] References Cited

U.S. PATENT DOCUMENTS

| | | | |
|---|---|---|---|
| 2,389,376 | 11/1945 | Mandin | 83/587 |
| 4,051,756 | 10/1977 | Bognar et al. | 83/587 |
| 4,074,840 | 2/1978 | Fulenwider et al. | 225/96.5 |
| 4,446,620 | 5/1984 | Velte | 30/92 |
| 4,587,733 | 5/1986 | Staempfli | 30/278 |
| 5,046,252 | 9/1991 | Tokuichie et al. | 30/258 |
| 5,129,158 | 7/1992 | Campagna | 30/92 |
| 5,203,083 | 4/1993 | Domonoske | 30/92 |

FOREIGN PATENT DOCUMENTS

| | | |
|---|---|---|
| 43 24 627 C1 | 3/1995 | Germany . |
| 2055662 | 3/1981 | United Kingdom . |

*Primary Examiner*—Hwei-Siu Payer
*Attorney, Agent, or Firm*—Darryl P. Frickey

[57] ABSTRACT

Appliance for cutting through filament-type material, in the case of which appliance an opposing bearing (23) for holding the filament-type material, a cutting unit (19) which is located transversely with respect to the longitudinal direction of the filament-type material, and an acceleration device (28), by means of which the cutting unit (19) can be accelerated to a cutting speed relative to a housing (2, 3), are arranged in the housing (2, 3).

18 Claims, 4 Drawing Sheets

CUTTING APPLIANCE FOR FILAMENT-TYPE MATERIAL

DESCRIPTION

The invention relates in general to a cutting appliance by means of which filament-type material can be cut through transversely with respect to its longitudinal direction. The problem frequently arises in this case that the cut surface or end surface which is produced by cutting through the filament-type material has an irregular or rough structure. This is disadvantageous, in particular if the filament-type material is an optical signal transmission line, for example such an optical signal transmission line having a core which conducts light and is composed of elastic synthetic material, since reflection and scatter losses can then occur on the cut surface or end surface, as a result of which the quality of signal transmission is reduced.

The invention is based on the object of providing a cutting device of the type mentioned initially, with whose aid smoother cut surfaces are achieved when cutting through filament-type material.

The solution to the present object is specified in claim 1. Advantageous refinements of the invention can be found in the subordinate subclaims.

An appliance according to the invention for cutting through filament-type material contains, in a housing, an opposing bearing for holding the filament-type material, a cutting unit which is located transversely with respect to the longitudinal direction of the filament-type material, and an acceleration device, by means of which the cutting unit can be accelerated to a cutting speed relative to the housing, which speed can be, for example, a predetermined cutting speed in order to obtain a cut surface which is as smooth as possible.

When cutting through filament-type material, it has been found that such material may be composed of a very wide range of materials, frequently producing a smooth cut surface when the cutting speed of the cutting unit and the nature of the material to be cut through are matched to one another. Thus, for example, optical signal transmission lines, whose core which conducts light is composed of elastic synthetic material, must be cut through at a relatively high cutting speed in order to obtain a cut surface which is as smooth as possible. A smooth cut surface is advantageous in particular in the case of optical signal transmission lines since fewer reflection and scatter effects, and thus lower signal transmission losses, then occur. However, such high cutting speeds can no longer be achieved just by manual operation of the cutting unit.

The acceleration device is thus provided in the case of the appliance according to the invention, with whose aid the cutting unit can be accelerated to a desired high speed, which is matched to the nature of the material to be cut. In this case, the acceleration device accelerates the cutting unit relative to the housing or the opposing bearing in which the filament-type material is located. In general, any device may be used as the acceleration device which is able to accelerate the cutting unit to the desired speed in a very short time before reaching the filament-type material to be cut through. In this case, the acceleration device can in principle be implemented by electrical, electromechanical or purely mechanical means. Pneumatic means would also be possible. The acceleration device can furthermore also be adjustable to different final speeds of the cutting unit. To this extent, one and the same cutting appliance could be used for cutting different filament-type materials. It would also be conceivable to refine the acceleration device such that different cutting unit speeds are achieved when cutting through filament-type material, depending on the cutting depth. Even smoother cut surfaces can thus be achieved by speed profiles matched to the respective materials. Such speed profiles can be set, for example, by controlling the cutting unit via cam discs.

It should also be mentioned that it is, of course, possible to accelerate the cutting unit along a straight line in the direction of the opposing bearing by means of the acceleration device, or such that the cutting unit is pivoted around a rotation axis in the direction of the opposing bearing by the acceleration device.

According to an advantageous refinement of the invention, the acceleration device has at least one spring element which can be prestressed and is preferably designed in the form of a compression spring. This results in a simple and cost-effective design of the acceleration device.

In order to comply with the safety requirements in various standards, the cutting appliance according to the invention furthermore has an interlocking device which, in its interlocking position, prevents any inadvertent movement of the cutting unit despite an acceleration force acting on it. The cutting unit is not released, in order to be capable of being accelerated by the acceleration device, until the interlocking device is moved into its unlocked position by operating preferably at least two actuating means which are physically separated from one another. In this case, the actuating means are preferably physically separated from one another to such an extent that an operator of the appliance always requires one hand to operate the respective actuating means. It is thus no longer possible to release the appliance or the cutting unit with one hand while at the same time inserting, for example, a finger on the other hand in the opposing bearing.

According to a highly advantageous refinement of the invention, the housing is composed of two housing parts which can pivot a common shaft, it likewise being possible for the cutting unit to pivot about this shaft. In this case, the opposing bearing and the acceleration device are each supported on one of the housing parts. The housing parts can furthermore each merge into a handle at their end facing away from the shaft, so that the entire appliance has a design like pliers and can be used as hand-held pliers.

In this case, the interlocking device can be designed as an interlocking bolt which can be displaced into the path of the cutting unit and is preferably mounted in one of the handles. The interlocking bolt can in this case be displaced via first actuating means which project out of the free end of the handle holding said interlocking bolt, while there are second actuating means on the other handle which act on a locking device, which prevents the displacement of the interlocking bolt, when the housing parts are completely pivoted onto one another, and move this locking device into a state which allows the displacement of the interlocking bolt.

Since the user of the pliers requires at least one hand to push the two handles together and must operate the first actuating means with the other hand, he or she can no longer accidentally insert, for example, a finger into the opposing bearing while releasing or accelerating the cutting unit, so that he or she is virtually no longer subject to any risk of injury.

A displaceably mounted sliding roller is preferably located at the free end of the cutting unit and rests at the end on the interlocking end of the interlocking bolt so that the user need apply only a small amount of force because of the small amount of friction between the sliding roller and the interlocking bolt when the latter is being displaced into its unlocked position. Thus, even relatively lengthy operation of the pliers does not lead to the user becoming fatigued.

According to a development of the appliance according to the invention, a compression spring is located directly between the associated housing part and the cutting unit, as the acceleration device. The compression spring is thus supported at one end on the cutting unit, to be precise on the edge which is opposite the cutting blade, and at the other end on that housing part which is opposite the housing part in which the opposing bearing is located. In this case, the sliding roller of the cutting unit is pressed against the interlocking bolt if the latter is in its interlocked position. This takes place irrespective of whether the pliers are open or closed. If the pliers are moved from their open state into their closed state, then, initially, only the said compression spring is stressed. After moving the interlocking bolt into its unlocked position and after moving the cutting unit into the sliding bearing, the cutting unit is moved out of this sliding bearing again during opening of the pliers. To this end, the cutting unit has an arm which is provided with an elongated hole into which a pin projects, said pin belonging to that housing part which is opposite the housing part which accommodates the opposing bearing. The process of movement of the cutting unit can thus also be controlled as a function of the pivoting position of the handles.

According to yet another refinement of the invention, tensioning means are provided for pivoting the housing parts away from one another. The pliers are thus continuously prestressed such that the handles try to pull apart from one another. At the same time, a blocking device can be provided which limits the pivoting of the housing parts and handles away from one another.

If this blocking device is rendered inoperative, then the housing parts and handles can be pivoted even further away from one another so that access into the interior of the pliers is then possible. In this state, a cutting blade which belongs to the cutting unit and can be inserted firmly into the cutting unit can be replaced.

According to another refinement of the invention, the opposing bearing can be removed from the housing or housing part in order, for example, to be exchanged for another having a different internal diameter. This is used for the purpose of selecting the respectively matching opposing bearing, having a corresponding internal diameter, for filament-type material having a predetermined external diameter. In this case, clamping means for firmly clamping the opposing bearing can be provided in the housing or housing part, in order to ensure that the opposing bearing is securely seated. These clamping means may be implemented by means of clamping balls, screws, etc. The opposing bearing itself may be composed of transparent material or may be provided with markings in order to allow observation or to determine the point at which the cutting region is located. The invention will be described in more detail in the following text with reference to an exemplary embodiment.

Figure 1:
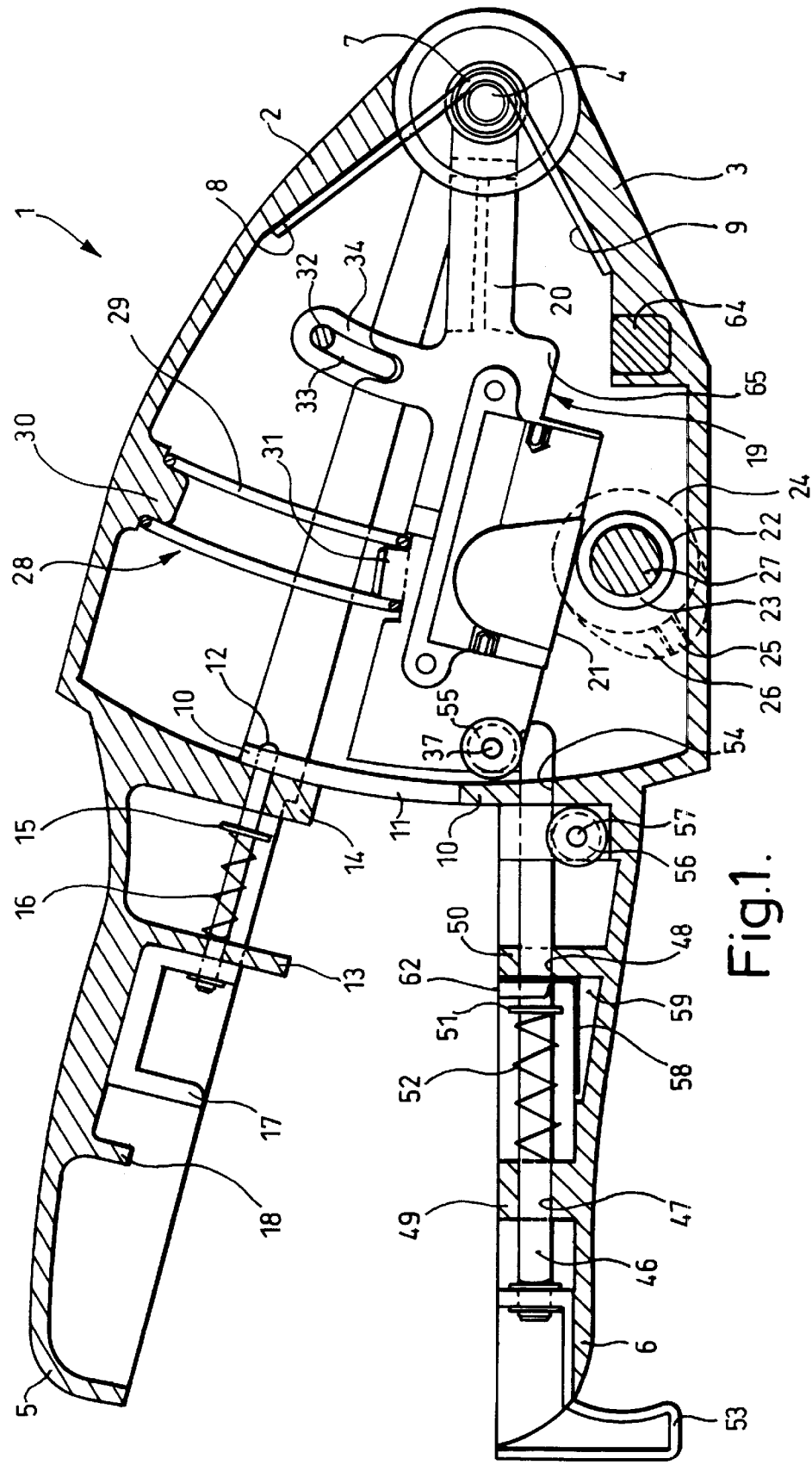
FIG. 1 shows cutting pliers in the open state.
Figure 2:
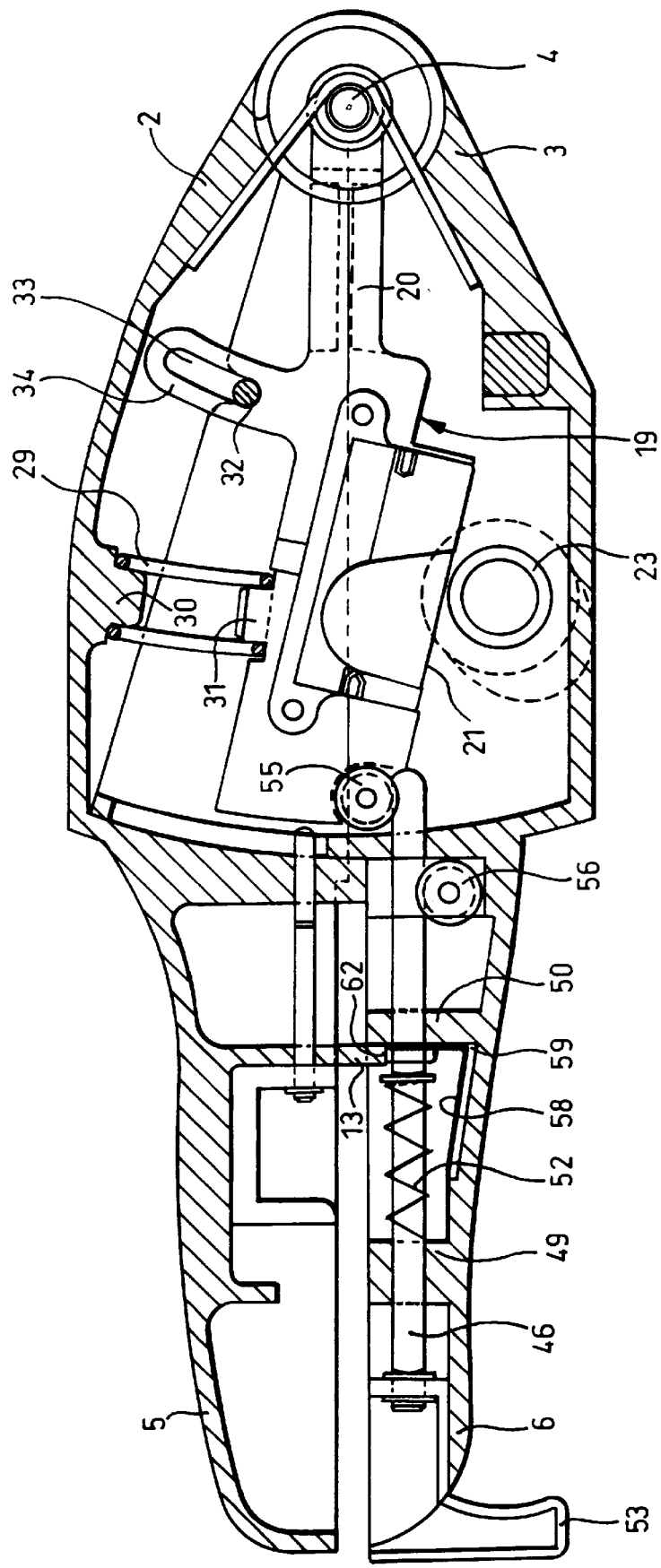
FIG. 2 shows the cutting pliers according to FIG. 1 in the closed state, with the cutting unit interlocked.
Figure 3:
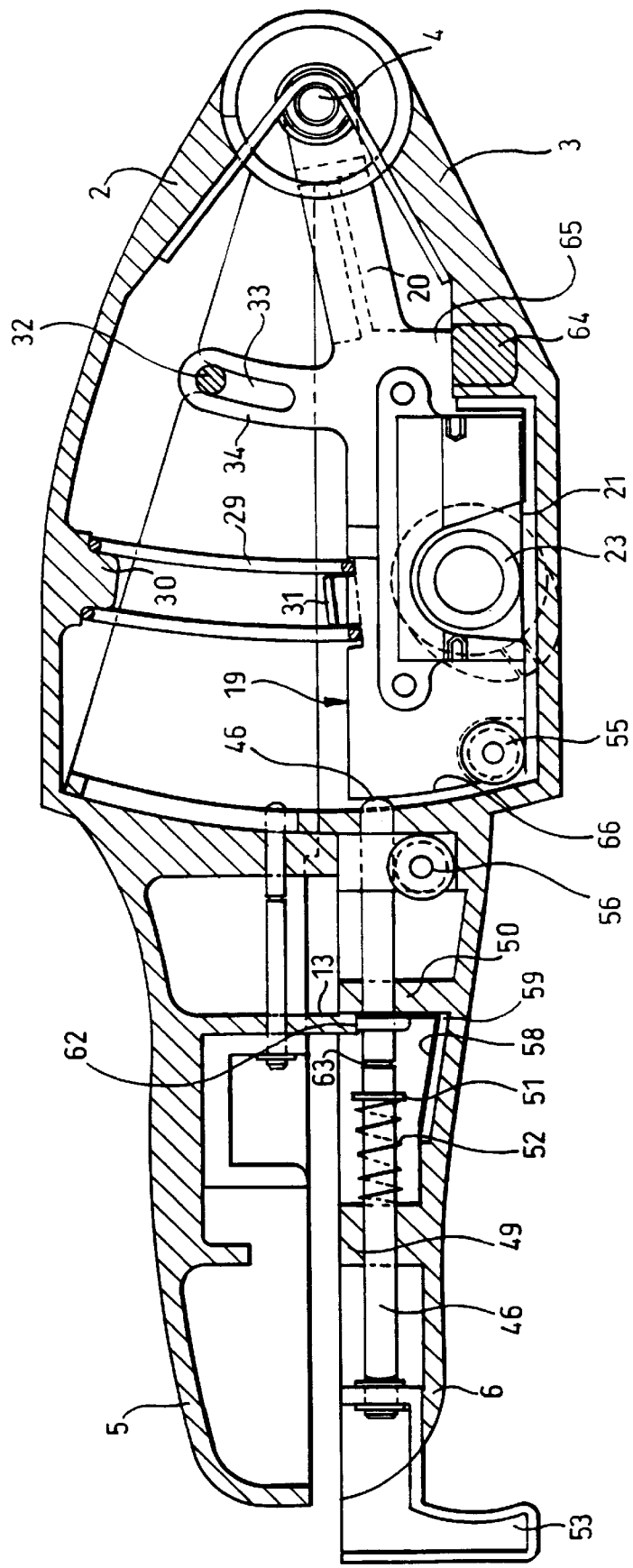
FIG. 3 shows the cutting pliers according to FIG. 1 in the closed state, with the cutting unit unlocked.

FIGS. 1 to 3 show the appliance according to the invention in the form of cutting pliers 1. The cutting pliers 1 have a first housing part 2 and a second housing part 3, the two of which can be pivoted about a common shaft 4 which is arranged at the front, pointed end of the cutting pliers 1. At the end facing away from the common shaft 4, the first housing part 2 merges into a first handle 5, and the second housing part 3 merges into a second handle 6. The first housing part 2 and the second housing part 3 are each designed as flat hollow bodies and can be pivoted in one another about the common shaft 4, those ends of the housing parts 2, 3 which point towards one another being open. The housing parts 2, 3 are pivoted away from one another, or are spread, about the common shaft 4 with the aid of a tension spring 7 which is seated on the common shaft 4, the tension spring 7 being wound around the common shaft 4 and being pressed by spring arms 8, 9 inwards against the housing parts 2, 3.

In order to prevent the housing parts 2, 3 pivoting completely away from one another, a rear end wall 10, which can be moved into the first housing part 2, of the second housing part 3, has an elongated hole 11 into which a pin 12 projects, which pin 12 is attached to the first handle 5. The pin 12 and the elongated hole 11 form a blocking device for limiting the pivoted position of the housing parts 2, 3 away from one another. The pin 12 is mounted between two projections 13, 14 on the first handle 5 and is arranged such that it can be displaced in its longitudinal direction. The pin 12 is fitted between the projections 13 and 14 with a disc 15 which is firmly connected to it, a compression spring 16 being arranged between the disc 15 and the rear-projection 13, which compression spring 16 is supported on the rear projection 13 and presses the pin 12 into the elongated hole 11 by means of the disc 15. The pin 12 is firmly connected to a slide 17 on that side of the rear projection 13 which is located towards the free end of the first handle 5 via which slide 17 the pin 12 can be moved out of the elongated hole 11 against the force of the compression spring 16. This is done by hand. If the slide 17 is moved against a further projection 18 at the rear end of the first handle 5, then the pin 12 releases the elongated hole 11 and the rear end wall 10, so that it is now possible for the first housing part 2 and the second housing part 3 to pivot further apart from one another. Access into the interior of the cutting pliers 1 is now possible.

Located in the interior of the first housing part 2 and the second housing part 3 is a cutting unit 19 which has an arm 20 through whose free end the common shaft 4 is passed. The cutting unit 19 is thus mounted in the interior of the cutting pliers 1 such that it can pivot about the shaft 4. In this arrangement, the cutting unit 19 is fitted with a cutting blade 21, whose plane is located in the pivoting plane of the cutting unit 19, and whose cutting blade 21 points in the direction of the second housing part 3.

Located in the second housing part 3 is a hole 22 which runs parallel to the shaft 4 and into which an opposing bearing 23 is in each case inserted from both of the outer sides of the second housing part 3. Since FIGS. 1 to 3 show a longitudinal section through the pliers 1, only the rear opposing bearing 23 can be seen there. Both opposing bearings are designed in the form of sleeves and have an outer circumferential flange 24 into which a screw, which is not illustrated, can press at the side, which screw is passed through a threaded channel 25 which is located in the outer thickened region 26 of the respective housing part 2 or 3. In this case, both opposing bearings 23 project so far into the interior of the cutting pliers 1 that a gap for the cutting blade 21 to pass through still remains between them.

The opposing bearings 23 are replaceable or can be exchanged for sleeves having a larger or smaller wall thickness in order to allow the internal diameter of the sleeves to be largely matched in each case to the external diameter of the filament-type material to be cut up.

The filament-type material to be cut up is illustrated only in FIG. 1, for clarity, to be precise as the shaded area. The longitudinal direction of the filament-type material in the region of the opposing bearings 23 extends parallel to the longitudinal direction of the shaft 4. The filament-type material is marked by the reference number 27.

An acceleration device 28 is used for driving and for accelerating the cutting unit 19. The acceleration device 28 is composed of a helically wound compression 30 spring 29, each of whose two ends engages over a first projection 30 and a second projection 31. The first projection 30 is integrally connected to the first housing part 2 and is at a distance from the inner surface of the upper wall of the first housing part 2. In contrast, the second projection 31 is located on the cutting unit 19 and points in the direction of the first projection 30. The compression spring 29 is sufficiently long that the projections 30, 31 never slide underneath it irrespective of the position in which the handles 5, 6 and the cutting unit 19 are located.

FIG. 1 shows the cutting pliers 1 in their furthest open position, in which the pin 12 strikes against the upper edge of the elongated hole 11. A pin 32 slides in an elongated hole 33 in a second arm 34 of the cutting unit 19, which elongated hole 33 is curved in the shape of an arc and is located concentrically with respect to the shaft 4. The cutting unit 19 is raised out of the region of the opposing bearings 23 by this pin 32 while the housing parts 2 and 3 are pivoting apart from one another.

Figure 4:
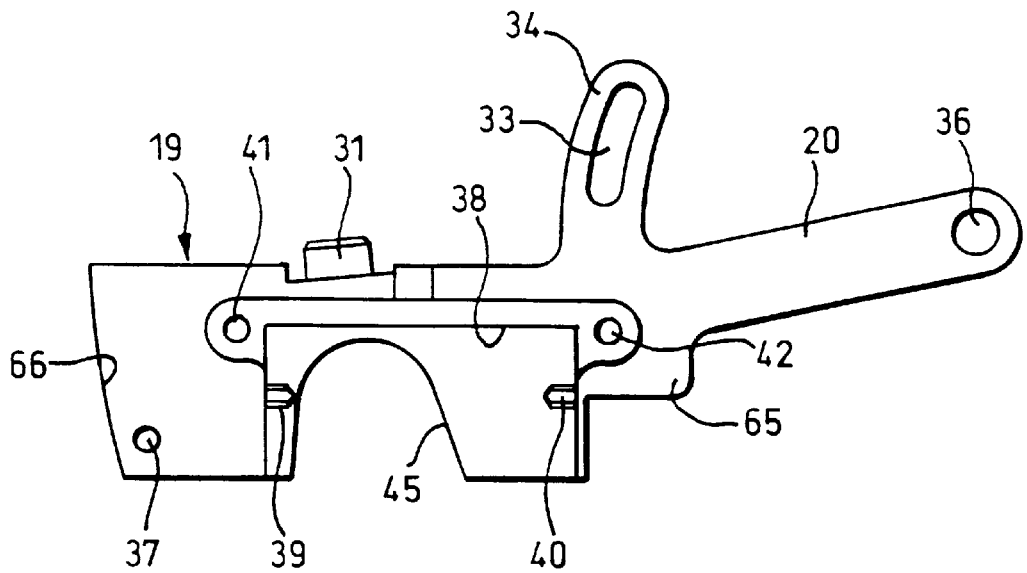
FIG. 4 shows a view of the cutting unit.
Figure 5:
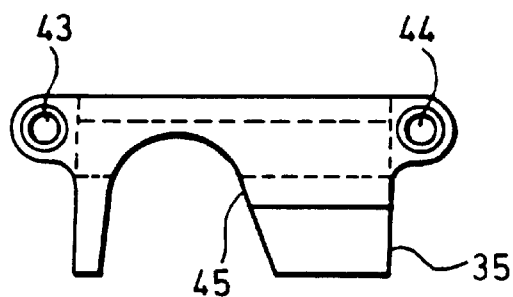
FIG. 5 shows a blade tensioning device of the cutting unit according to FIG. 4.
Figure 6:
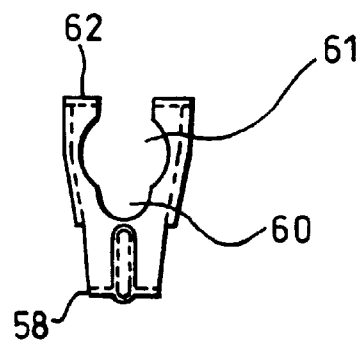
FIG. 6 shows an end view of a locking device which is shown in FIGS. 1 to 3.

FIG. 4 shows the cutting unit 19 in a specific illustration, while FIG. 5 shows a blade tensioning device 35 by means of which the cutting blade 21, which is not illustrated here, is mounted on the cutting unit 19.

An opening 36 at the free end of the first arm 20 can be seen in the cutting unit 19 according to FIG. 4, through which opening 36 the shaft 4 projects. A shaft 37 for holding a sliding roller, which is still to be described, is located at the left-hand end of the cutting unit 19, facing the handles 5, 6, in its lower region. A rectangular depression 38, having two centering tabs 39 and 40 at the side, is located in the central region of the cutting unit 19, on one of its sides. The depression 38 is used to accommodate the cutting blade 21, which has opposite cutouts at the side into which the centering tabs 39, 40 project. The cutting blade 21 is in this way secured in the cutout 38 against displacement. A threaded hole 41, 42 is in each case located above a respective centering tab 39, 40.

The already mentioned blade tensioning device 35, which is illustrated in FIG. 5, is used to clamp the cutting blade 21 firmly in the cutout 38. This blade 35 tensioning device 35 is composed of an essentially flat plate having two mutually opposite through-openings 43, 44. Screws are screwed through these through-openings 43, 44 into the threaded holes 41, 42 in order in this way to mount the blade tensioning device 35 on the cutting unit 19 and in order thus to clamp the cutting blade 21 firmly in the cutout 38. The said screws do not need to be completely unscrewed out of the threaded holes 41, 42, in order to simplify the replacement of the cutting blade 21. If compression springs are located on the said screws between the cutting unit 19 and the blade tensioning device 35, then it is sufficient to undo the screws by a certain amount in order that the compression springs can lift the blade tensioning device 35 off the cutting unit 19 to such an extent that the cutting blade 21 can be removed from the cutout 38 via the centering tabs 39, 40. The blade tensioning device 35 thus does not need to be completely removed.

A notch 45 is located, in each case at the same point, in both the cutting unit 19 and in the blade tensioning device 35, to allow the mutually opposite ends of the opposing bearings 23 to be accommodated. The opposing bearings 23 can then be arranged very closely opposite one another so that only the cutting blade 21 can be moved between them. This leads to a better cutting result.

As can furthermore be seen in FIG. 1, an interlocking device for interlocking and unlocking the cutting unit 19 is located in the second handle 6.

The interlocking device is composed of an interlocking bolt 46 which is mounted in the second handle 6 such that it can be displaced in a sliding manner in the longitudinal direction of said second handle 6. To this end, it passes through two openings 47 and 48 in webs 49, 50, fitting in said openings, these webs 49, 50 being arranged at a distance from one another in the longitudinal direction of the second handle 6. The interlocking bolt 46 is firmly connected to a washer 51 in the region between the webs 49, 50, a compression spring 52 being 35 arranged between the washer 51 and the web 50, being supported on the web 50 and on the washer 51, and pressing the interlocking bolt 46 in the direction of the cutting unit 19.

In order to displace the interlocking bolt 46 in its longitudinal direction by hand and/or to the rear, said interlocking bolt 46 is connected at its rear end to an actuating element 53. Part of this actuating element 53 projects out of the rear region of the second handle 6. It can be operated, for example, by a user of the pliers using his or her finger.

When the interlocking bolt 46 is in its interlocked position, that is to say is in the position displaced furthest towards the cutting unit 19, then it projects through an opening 54 in the rear end wall 10 into the second housing part 3. At the same time, a sliding roller 55 comes to rest on its free end, at the top, this sliding roller 55 being mounted on the shaft 37 of the cutting unit 19 such that it can rotate. If the interlocking bolt 46 is designed with a round cross-section, then the sliding roller 55 may have a hollow keyway along its end surface on the circumferential side. A further sliding roller 56 may be provided in order to support the interlocking bolt 46 -on the side of the interlocking bolt 46 opposite the sliding roller 55, which further sliding roller 56 is mounted on a pin 57 such that it can rotate, this pin 57 being mounted on the second handle 6. The sliding rollers 55, 56 make it possible to displace the interlocking bolt 46 in its longitudinal direction without exercising so much force. The sliding roller 56 may also have a hollow keyway along its end circumferential edge.

A further locking device interacts with the interlocking device. This locking device is composed of a sheet-metal spring 58 which is bent in the form of a bracket and has a short limb and a long limb. The long limb runs parallel to the interlocking bolt 46, and the short limb runs at right angles to it. In this case, the long limb is firmly connected at its free end to the second handle 6, to be precise adjacent to the web 49, the sheet-metal spring overall coming to rest between the webs 49 and 50. A space 59 is provided in the second handle 6, in the angled region of the sheet-metal spring 58, into which space 59 the sheet-metal spring 58 can be deflected. The short limb of the sheet-metal spring 58, which is at right angles to the interlocking bolt 46 and through which the interlocking bolt 46 passes, has a semicircular opening 60 with a diameter which is less than the diameter of the interlocking bolt 46. This opening then merges in the direction of the free end of the short limb into an opening 61, whose diameter is larger than the diameter of the interlocking bolt 46. A stop surface 62 is also located at the free end of the short limb of the sheet-metal spring 58.

Located inside the interlocking bolt 46 is a circumferential groove 63 (see FIG. 3) in which the short limb of the sheet-metal spring 58 engages when the interlocking bolt 46 is located in its interlocked position, that is to say comes to rest with its free end underneath the sliding roller 55. The region of the interlocking bolt 46 which is formed by the circumferential groove 63 and has a smaller diameter is thus located in the opening 60 in the short limb of the sheet-metal spring 58. This means that the interlocking bolt 46 cannot move either forwards or backwards. It is not until the handles 5 and 6 have been moved so far towards one another that the extended projection 13, which points towards the second handle 6, on the first handle 5 presses against the stop surface 62 and, in consequence, the sheet-metal spring 58 bends into the space 59 that the large opening 61 becomes concentric to the interlocking bolt 46, so that said interlocking bolt 46 can now be displaced in its longitudinal direction, for example by 486 operating the actuating element 53, or by pulling it out of the second handle element 6. When the actuating element 53 is released, the compression spring 52 presses the interlocking bolt 46 forwards again in the direction of the cutting unit 19 until the short limb of the sheet-metal spring 58 latches into the circumferential groove 63 again.

A damping cushion 64 for the cutting unit 19 is also located in the second housing part 3, one edge 65 of the cutting unit 19 striking against the damping cushion 64 when, after acceleration, it has cut through the material to be cut through. The damping cushion 64 is composed of elastic material, for example of rubber, plastic or the like. It may also be a spring arrangement.

The method of operation of the cutting pliers will be explained in more detail in the following text, making reference to FIGS. 1 to 3.

FIG. 1 shows the open position of the cutting pliers, in which the interlocking bolt 46 is located in its interlocked position. The cutting unit 19 is located with its sliding roller 55 on the front, free end of the interlocking rod 46 and initially cannot move in the direction of the opposing bearings 23. In this state, the compression spring 29 is not very severely prestressed, that it does not yet produce any relatively large acceleration force on the cutting unit 19. An optical cable, for example, which is to be cut through and has an elastic core which conducts light, is guided into both opposing bearings 23 in this state.

According to FIG. 2, the pliers 1 are now closed by the two handles 5 and 6 being moved towards one another. At the same time, the interlocking bolt 46 initially remains in its interlocked position, so that the cutting unit 19 cannot move yet. Instead of this, only the compression spring 29 is initially prestressed, so that a large acceleration force now acts on the cutting unit 19. When the handles 5 and 6 reach their closed position, then the projection 13 of the first handle 5 acts on the stop surface 62 at the free end of the short limb of the sheet-metal spring 58. In other words, the short limb of the sheet-metal spring 58 is pressed downwards, to be precise into the space 59 in the second handle 6. In consequence, the interlocking bolt 46 comes to rest in the large opening 61 in the short limb of the sheet-metal spring 58, so that the interlocking bolt 46 can now be pulled into its unlocked position via the actuating element 53. It thus releases the sliding roller 55, so that the compression spring 29 can accelerate the cutting unit 19 strongly, and said cutting unit 19 can cut through the filament-type material 27 in the opposing bearings 23. After cutting through the filament-type material 27, the cutting unit 19 is damped by the damping cushion 64. This state is illustrated in FIG. 3. When the cutting unit 19 has been moved as far as possible into the second housing part 3, the compression spring 52 cannot yet push the interlocking bolt 46 back into its interlocked position, even if the actuating element 53 is released, since said interlocking bolt 46 is still in contact with a stop surface 66 on the cutting unit 19 in this state.

If the load on the handles 5 and 6 is now released, then they move apart from one another, or spread, as a result of the effect of the tensioning spring 7 on the housing parts 2 and 3. This continues until the pin 12 strikes against the upper end of the elongated hole 11. The arm 34 and, with it, the cutting unit 19, are driven by the pin 32 while the housing parts 2 and 3 are spreading. As soon as the final position according to FIG. 1 is reached again, the interlocking bolt 46 is pushed into its interlocked position by the effect of the compression spring 52, and the free end of said interlocking bolt 46 passes under the sliding roller 55. The movement of the interlocking bolt 46 is in this way stopped as soon as the short limb of the sheet-metal spring 58 engages in the circumferential groove 63 again. A cutting cycle is thus complete.

We claim:

1. An apparatus for cutting through filament-type material, said apparatus comprising an opposing bearing (23) for holding the filament-type material, a cutting unit (19) which is located transversely with respect to the longitudinal direction of the filament-type material, and an acceleration device (28), for accelerating the cutting unit (19) to a cutting speed relative to a housing (2,3), said bearing, said cutting unit and said acceleration device are arranged in said housing (2, 3) characterized in that the housing is composed of two housing parts (2, 3) pivoted about a common shaft (4), the cutting unit (19) is pivoted about this shaft (4), and the opposing bearing (23) and the acceleration device (28) are each supported case on a respective one of the housing parts (2, 3).

2. The apparatus according to claim 1, characterized in that the acceleration device (28) has at least one spring element (29) which can be prestressed.

3. The apparatus according to claim 2, characterized in that the spring element (29) is in the form of a compression spring.

4. The apparatus according to claim 1, characterized by an interlocking device (46) which, in its locked position, prevents any movement of the cutting unit (19).

5. The apparatus according to claim 4, characterized in that the interlocking device (46) can be moved into its unlocked position by operating at least two actuating means (53, 58) which are physically separated from one another.

6. The apparatus according to claim 4 characterized in that the housing parts (2, 3) each merge into a handle (5, 6) at its end facing away from the shaft (4).

7. The apparatus according to claim 6, characterized in that the interlocking device is designed as an interlocking bolt (46) which can be pushed into the path of the cutting unit (19) and is mounted in one of the handles.

8. The apparatus according to claim 7, characterized in that the interlocking bolt (46) can be displaced via first actuating means (53) which project out of a free end of the handle (6) which accommodates said interlocking bolt (46).

9. The apparatus according to claim 8, characterized in that second actuating means (13) are provided on the other handle (5), act on a locking device (58), which prevents the displacement of the interlocking bolt (46), when the housing parts (2, 3) are pivoted completely onto one another, and move said locking device (58) into a state which permits the displacement of the interlocking bolt (46).

10. The apparatus according to claim 9, characterized in that a sliding roller (55) is mounted at a free end of the cutting unit (19) such that it can rotate and rest at one end of an interlocking end of the interlocking bolt (46).

11. The apparatus according to claim 10, characterized in that the cutting unit (19) has a cutting blade (21) which can be inserted thereinto.

12. The apparatus according to claim 11, characterized in that said acceleration device comprises a compression spring (29) which is located directly between one of the housing parts (2) and the cutting unit (19).

13. The apparatus according to claim 12, characterized in that the cutting unit (19) is connected to an arm (34) which has an elongated hole (33) and into which a pin (32) projects from that housing part (2) which is opposite the housing part (3) which accommodates the opposing bearing (23).

14. The apparatus according to claim 13, characterized by tensioning means (7, 8, 9) for pivoting the housing parts (2, 3) away from one another.

15. The apparatus according to claim 14, characterized by a blocking device (11, 12) for limiting the pivoted position of the housing parts (2, 3) away from one another.

16. The apparatus according to claim 15, characterized in that the opposing bearing (23) is removable from the housing.

17. The apparatus according to claim 16, characterized by clamping means (25, 26) for firmly clamping the opposing bearing (23) in the housing.

18. The apparatus according to claim 17, characterized in that the cutting speed is a predetermined speed.

* * * * *